(12) United States Patent
Surace

(10) Patent No.: US 12,039,811 B2
(45) Date of Patent: Jul. 16, 2024

(54) SYSTEMS AND METHODS FOR DETECTING VEHICLE OR ENVIRONMENTAL CHANGES FROM DATA FROM AUTOMATED VEHICLES

(71) Applicant: Honeywell International Inc., Morris Plains, NJ (US)

(72) Inventor: Lawrence Surace, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 360 days.

(21) Appl. No.: 16/570,727

(22) Filed: Sep. 13, 2019

(65) Prior Publication Data
US 2021/0082208 A1   Mar. 18, 2021

(51) Int. Cl.
| G07C 5/00 | (2006.01) |
| B64C 39/02 | (2023.01) |
| G05D 1/00 | (2024.01) |
| G07C 5/08 | (2006.01) |
| G08G 5/00 | (2006.01) |
| G08G 5/04 | (2006.01) |

(52) U.S. Cl.
CPC ............ *G07C 5/008* (2013.01); *B64C 39/024* (2013.01); *G05D 1/0027* (2013.01); *G07C 5/0808* (2013.01); *G08G 5/0069* (2013.01); *G08G 5/045* (2013.01)

(58) Field of Classification Search
CPC .... G08G 5/0069; G08G 5/045; G08G 5/0091; G08G 5/0039; G08G 5/0082; G08G 5/0026; G08G 5/0043; G08G 5/0013; G01S 13/933; G01S 17/933; B64C 39/024; H04W 4/40; G07C 5/0808; G07C 5/008; G01C 21/20; G05D 1/0027; G05D 1/101
See application file for complete search history.

(56) References Cited

U.S. PATENT DOCUMENTS

| 2002/0007237 A1* | 1/2002 | Phung | G05B 23/0275 |
| | | | 709/219 |
| 2010/0114411 A1* | 5/2010 | Schmidt | B64C 25/001 |
| | | | 340/960 |
| 2016/0364989 A1* | 12/2016 | Speasl | G08G 5/0082 |

(Continued)

FOREIGN PATENT DOCUMENTS

| CN | 106651162 A | * | 5/2017 | ......... G06Q 10/0635 |
| CN | 109219838 A | * | 1/2019 | ........... G08G 1/0133 |

OTHER PUBLICATIONS

Machine Translation: CN-109219838-A (Year: 2019).*
(Continued)

*Primary Examiner* — Anne Marie Antonucci
*Assistant Examiner* — Connor L Knight
(74) *Attorney, Agent, or Firm* — Lorenz & Kopf LLP

(57) ABSTRACT

Disclosed are methods, systems, and non-transitory computer-readable medium for managing data from vehicles. For instance, the method may include receiving vehicle data from a vehicle of a plurality of vehicles; obtaining collective vehicle data and vehicle parameters; performing an analysis on the vehicle data, the collective vehicle data, and the vehicle parameters to: detect a vehicle parameter event, or detect an environment change; and in response to detecting the vehicle parameter event or the environment change, transmitting a status message to a service associated with the vehicle.

17 Claims, 8 Drawing Sheets

(56) References Cited

U.S. PATENT DOCUMENTS

| | | | | |
|---|---|---|---|---|
| 2017/0140652 A1* | 5/2017 | Hodges | ................. | G07C 5/008 |
| 2017/0242431 A1* | 8/2017 | Dowlatkhah | ........ | G08G 5/0069 |
| 2017/0291591 A1* | 10/2017 | Steer | ...................... | B60T 8/885 |
| 2017/0358224 A1* | 12/2017 | Priest | ................... | G08G 5/0069 |
| 2018/0232964 A1* | 8/2018 | Chen | ..................... | G07C 5/008 |
| 2019/0014461 A1* | 1/2019 | Winkle | ............... | G08G 5/0056 |
| 2019/0031330 A1* | 1/2019 | Groden | .................. | B64C 13/16 |
| 2019/0156681 A1* | 5/2019 | Whiting | .............. | G08G 5/0021 |
| 2019/0279447 A1* | 9/2019 | Ricci | .................... | G06Q 20/145 |
| 2019/0304314 A1* | 10/2019 | Hochwarth | .......... | G08G 5/0091 |
| 2020/0361480 A1* | 11/2020 | Rodriguez Bravo | . | B60W 50/14 |

OTHER PUBLICATIONS

Machine Translation: CN-106651162-A (Year: 2017).*

European Search Report and Written Opinion issued on Oct. 9, 2020 in counterpart European Patent Application No. 20195169 (15 pages, in English).

Kim, Yoohwan, et al. "A lightweight communication architecture for small UAS Traffic Management (SUTM)." 2015 Integrated Communication, Navigation and Surveillance Conference (ICNS). IEEE, 2015. (9 pages, in English).

Kim, Yoohwan, et al. "A lightweight communication architecture for small UAS Traffic Management (SUTM)." 2015 Integrated Communication, Navigation and Surveillance Conference (ICNS). IEEE, 2015. (Powerpoint) (29 pages, in English).

* cited by examiner

SYSTEMS AND METHODS FOR DETECTING VEHICLE OR ENVIRONMENTAL CHANGES FROM DATA FROM AUTOMATED VEHICLES

TECHNICAL FIELD

Various embodiments of the present disclosure relate generally to systems and methods for managing data from vehicles and, more particularly, to systems and methods for managing data from aerial vehicles.

BACKGROUND

The infrastructure and processes of urban air mobility (UAM) may present several challenges. For instance, UAM may require large amounts of data gathering, communication, processing, and reporting to ensure timely, safe, and efficient resource allocation for travel in the UAM environment. For instance, certification authorities may require that operators of UAM vehicles ensure certain tolerances on vehicle operations, such as, among other things, sufficient vehicle structural integrity, sufficient power system reserves and health, sufficient vehicle spacing within traffic limitations, and obstacle avoidance. Data for each of these types of tolerances may need to be reported and checked every few seconds during the course of a flight for a UAM vehicle, to ensure that the UAM vehicles in the urban environment are safely operating. Moreover, the same data may be used to efficiently manage UAM vehicles (e.g., for maintenance and dispatch purposes). As the amount of data for certification purposes could conceivably overwhelm operator systems and/or interfere with operator processes outside certification compliance, a challenge may be in how to gather, process, and present relevant information to operators of UAM vehicles.

The present disclosure is directed to overcoming one or more of these above-referenced challenges.

SUMMARY OF THE DISCLOSURE

According to certain aspects of the disclosure, systems and methods are disclosed for managing data from vehicles.

For instance, a method may include receiving vehicle data from a vehicle of a plurality of vehicles; obtaining collective vehicle data and vehicle parameters; performing an analysis on the vehicle data, the collective vehicle data, and the vehicle parameters to: detect a vehicle parameter event, or detect an environment change; and in response to detecting the vehicle parameter event or the environment change, transmitting a status message to a service associated with the vehicle.

A system may include a memory storing instructions; and a processor executing the instructions to perform a process. The process may include: receiving vehicle data from a vehicle of a plurality of vehicles; obtaining collective vehicle data and vehicle parameters; performing an analysis on the vehicle data, the collective vehicle data, and the vehicle parameters to: detect a vehicle parameter event, or detect an environment change; and in response to detecting the vehicle parameter event or the environment change, transmitting a status message to a service associated with the vehicle.

A non-transitory computer-readable medium may store instructions that, when executed by a processor, cause the processor to perform a method. The method may include: receiving vehicle data from a vehicle of a plurality of vehicles; obtaining collective vehicle data and vehicle parameters; performing an analysis on the vehicle data, the collective vehicle data, and the vehicle parameters to: detect a vehicle parameter event, or detect an environment change; and in response to detecting the vehicle parameter event or the environment change, transmitting a status message to a service associated with the vehicle.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to managing data from vehicles.

In general, the present disclosure is directed to systems and methods for managing data from aerial vehicles. A system of the present disclosure may obtain vehicle data from a vehicle of a plurality of vehicles; determine whether a vehicle parameter event or an environment change occurs; and in response to detecting the vehicle parameter event or the environment change, transmit a status message to a service associated with the vehicle. The vehicle parameter events may detect whether power systems (e.g., batteries), structural components, or actuation systems, etc. of the vehicle require maintenance, are unsafe to continue (either immediately or for a completion of a next task, etc.). The vehicle parameter events may also detect whether the vehicle is tracking a planned path or detect whether traffic for the vehicle is too crowded. The environment change detection process may also indicate that a new obstacle for the vehicle (and vehicles like it) is new to the environment of the vehicle, so that all vehicles (or a portion thereof) may be made aware of the new obstacle.

For instance, the system of the present disclosure may gather, store, and process vehicle data to ensure certification compliance and provide additional feedback to UAM operators. For instance, the system of the present disclosure may analyze the vehicle data and check for sufficient vehicle structural integrity, sufficient power system reserves and health, sufficient vehicle spacing within traffic limitations, and obstacle avoidance. As an example, the system of the present disclosure may inform operators of battery information (charge, discharge rate, health, etc.), health-of-vehicle information (structural or actuation systems), location history and flight plan tracking, etc. Furthermore, the system of the present disclosure can provide go versus no-go decisions to operators.

While this disclosure describes the systems and methods with reference to aircraft, it should be appreciated that the present systems and methods are applicable to management of vehicles, including those of drones, automobiles, ships, or any other autonomous and/or Internet-connected vehicle.

Figure 1:
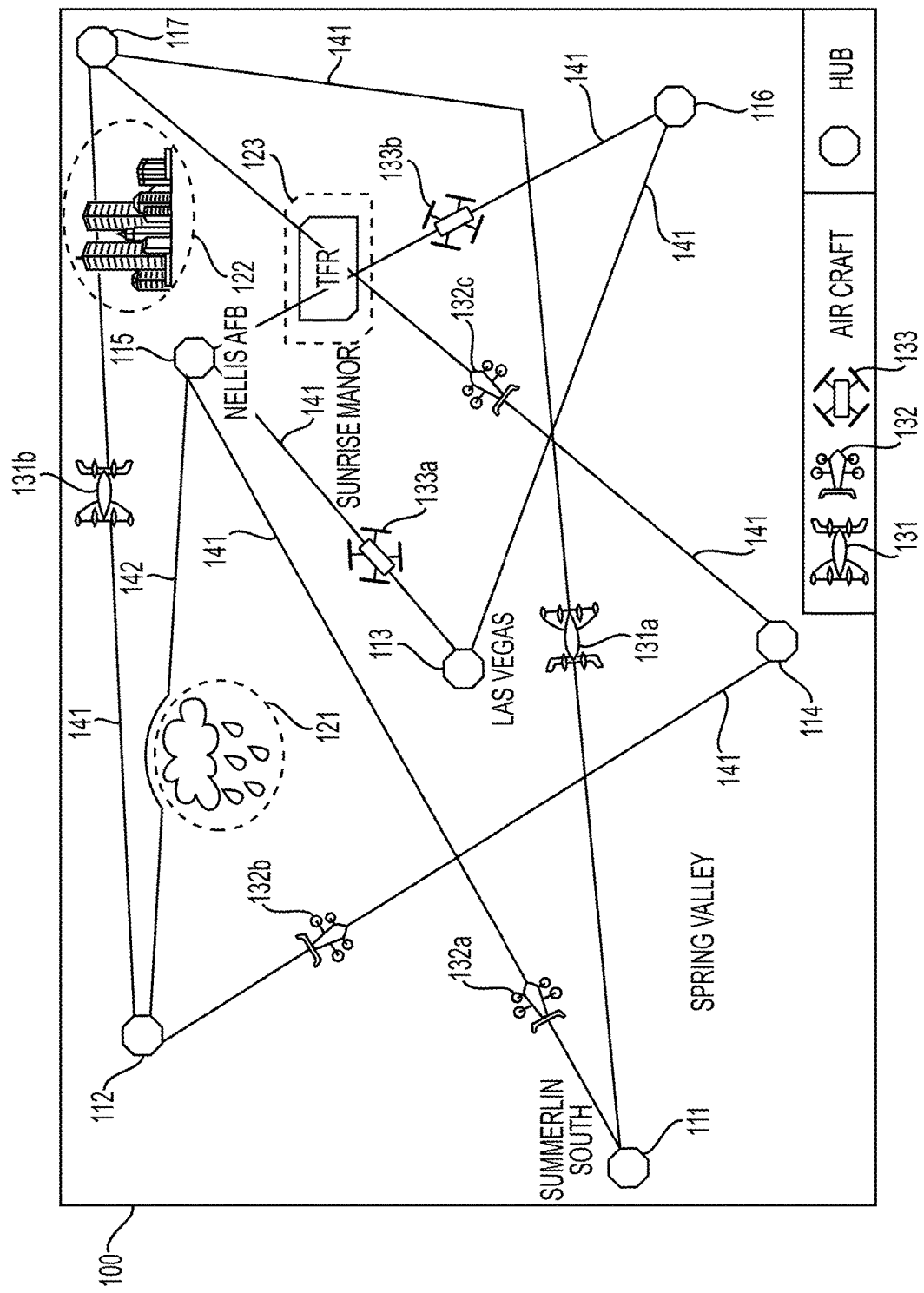
FIG. 1 depicts an example environment in which methods, systems, and other aspects of the present disclosure may be implemented.

As shown in FIG. 1, FIG. 1 depicts an example environment in which methods, systems, and other aspects of the present disclosure may be implemented. The environment of FIG. 1 may include an airspace 100 and one or more hubs 111-117. A hub, such as any one of 111-117, may be a ground facility where aircraft may take off, land, or remain parked (e.g., airport, vertiport, heliport, vertistop, helistop, temporary landing/takeoff facility, or the like). The airspace 100 may accommodate aircraft of various types 131-133 (collectively, "aircraft 131" unless indicated otherwise herein), flying at various altitudes and via various routes 141. An aircraft, such as any one of aircraft 131a-133b, may be any apparatus or vehicle of air transportation capable of traveling between two or more hubs 111-117, such as an airplane, a vertical take-off and landing aircraft (VTOL), a drone, a helicopter, an unmanned aerial vehicle (UAV), a hot-air balloon, a military aircraft, etc. Any one of the aircraft 131a-133b may be connected to one another and/or to one or more of the hubs 111-117, over a communication network, using a vehicle management computer corresponding to each aircraft or each hub. Each vehicle management computer may comprise a computing device and/or a communication device, as described in more detail below in FIGS. 3A and 3B. As shown in FIG. 1, different types of aircraft that share the airspace 100 are illustrated, which are distinguished, by way of example, as model 131 (aircraft 131a and 131b), model 132 (aircraft 132a, 132b, and 132c), and model 133 (aircraft 133a and 133b).

As further shown in FIG. 1, an airspace 100 may have one or more weather constraints 121, spatial restrictions 122 (e.g., buildings), and temporary flight restrictions (TFR) 123. These are exemplary factors that a vehicle management computer of an aircraft may be required to consider and/or analyze in order to derive the most safe and optimal flight trajectory of the aircraft. For example, if a vehicle management computer of an aircraft planning to travel from hub 112 to hub 115 predicts that the aircraft may be affected by an adverse weather condition, such as weather constraint 121, in the airspace, the vehicle management computer may modify a direct path (e.g., the route 141 between hub 112 and hub 115) with a slight curvature away from the weather constraint 121 (e.g., a northward detour) to form a deviated route 142. For instance, the deviated route 142 may ensure that the path and the time of the aircraft (e.g., 4-D coordinates of the flight trajectory) do not intersect any position and time coordinates of the weather constraint 121 (e.g., 4-D coordinates of the weather constraint 121).

As another example, the vehicle management computer of aircraft 131b may predict, prior to take-off, that spatial restriction 122, caused by buildings, would hinder the direct flight path of aircraft 131b flying from hub 112 to hub 117, as depicted in FIG. 1. In response to that prediction, the vehicle management computer of aircraft 131b may generate a 4-D trajectory with a vehicle path that bypasses a 3-dimensional zone (e.g., zone including the location and the altitude) associated with those particular buildings. As yet another example, the vehicle management computer of aircraft 133b may predict, prior to take-off, that TFR 123, as well as some potential 4-D trajectories of another aircraft 132c, would hinder or conflict with the direct flight path of aircraft 133b, as depicted in FIG. 1. In response, the vehicle management computer of aircraft 133b may generate a 4-D trajectory with path and time coordinates that do not intersect either the 4-D coordinates of the TFR 123 or the 4-D trajectory of the other aircraft 132c. In this case, the TFR 123 and collision risk with another aircraft 132c are examples of dynamic factors which may or may not be in effect, depending on the scheduled time of travel, the effective times of TFR, and the path and schedule of the other aircraft 132c. As described in these examples, the 4-D trajectory derivation process, including any modification or re-negotiation, may be completed prior to take-off of the aircraft.

As another example, the vehicle management computer of aircraft 131b may determine to use one of the routes 141 that are set aside for aircraft 131 to use, either exclusively or non-exclusively. The aircraft 131b may generate a 4-D trajectory with a vehicle path that follows one of the routes 141.

As indicated above, FIG. 1 is provided merely as an example environment of an airspace that includes exemplary types of aircraft, hubs, zones, restrictions, and routes. Regarding particular details of the aircraft, hubs, zones, restrictions, and routes, other examples are possible and may differ from what was described with respect to FIG. 1. For example, types of zones and restrictions which may become a factor in trajectory derivation, other than those described above, may include availability of hubs, reserved paths or sky lanes (e.g., routes 141), any ground-originating obstacle which extends out to certain levels of altitudes, any known zones of avoidance (e.g., noise sensitive zones), air transport regulations (e.g., closeness to airports), etc. Any factor that renders the 4-D trajectory to be modified from the direct or the shortest path between two hubs may be considered during the derivation process.

Figure 2:
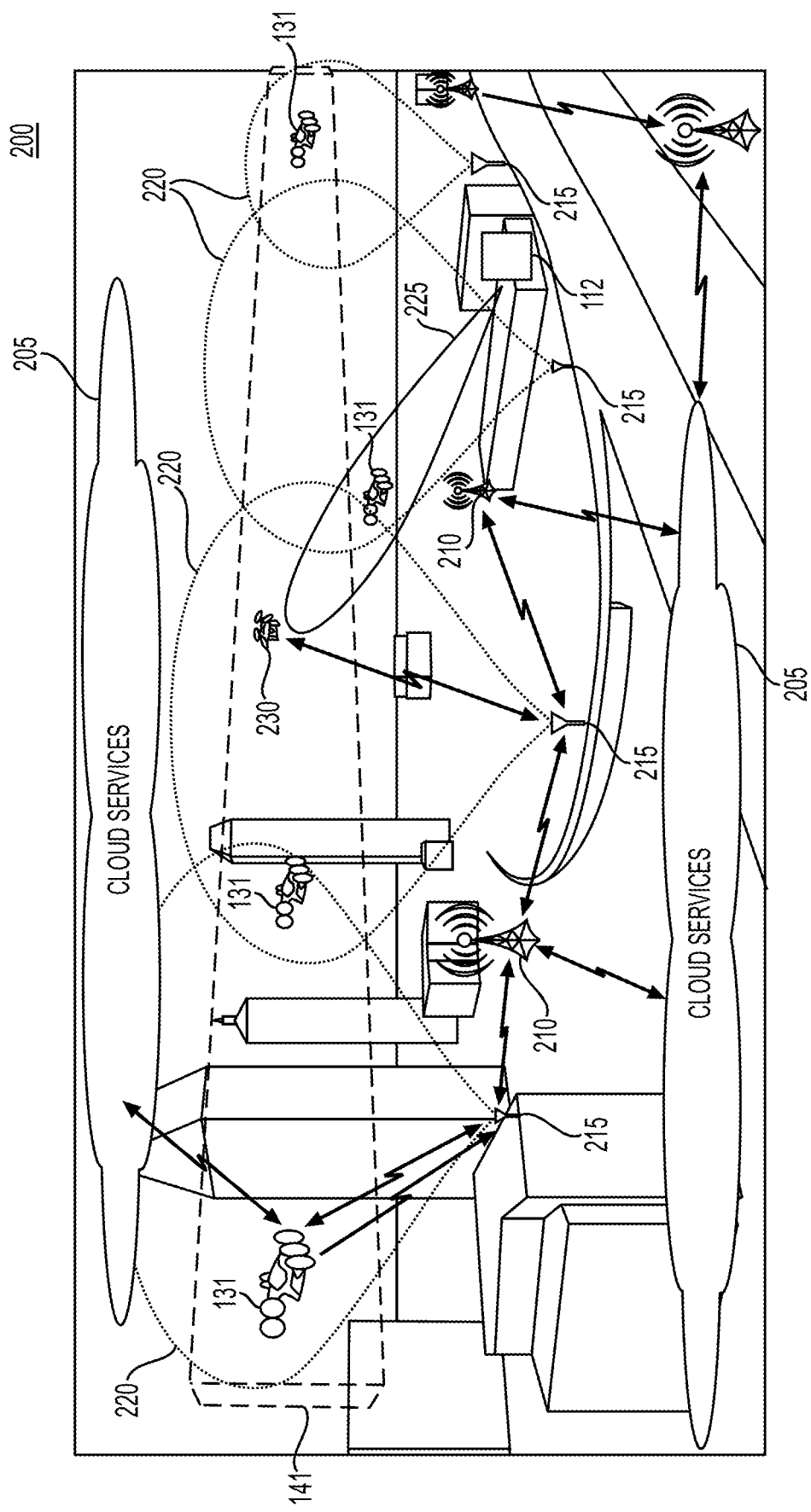
FIG. 2 depicts an exemplary system, according to one or more embodiments.

FIG. 2 depicts an exemplary system, according to one or more embodiments. The system 200 depicted in FIG. 2 may include one or more aircraft, such as aircraft 131, one or more intruder aircraft 230, a cloud service 205, one or more communications station(s) 210, and/or one or more ground station(s) 215. The one or more aircraft 131 may be traveling from a first hub (e.g., hub 114) to a second hub (e.g., hub 112) along a route of routes 141. Between, near, and/or on hubs, such as hubs 111-117, the one or more ground station(s) 215 may be distributed (e.g., evenly, based on traffic considerations, etc.) along/near/on/under routes 141. Between, near, and/or on hubs, such as hubs 111-117, the one or more communications station(s) 210 may be distributed (e.g., evenly, based on traffic considerations, etc.). Some (or all) of the one or more ground station(s) 215 may be paired with a communication station 210 of the one or more communications station(s) 210.

Each of the one or more ground station(s) 215 may include a transponder system, a radar system, and/or a datalink system.

The radar system of a ground station 215 may include a directional radar system. The directional radar system may be pointed upward (e.g., from ground towards sky) and the directional radar system may transmit a beam 220 to provide three-dimensional coverage over a section of a route 141. The beam 220 may be a narrow beam. The three-dimensional coverage of the beam 220 may be directly above the ground station 215 or at various skewed angles (from a vertical direction). The directional radar system may detect objects, such as aircraft 131, within the three-dimensional coverage of the beam 220. The directional radar system may detect objects by skin detection. In the case of the ground station 215 being positioned on a hub, such as the hub 112, the directional radar system may transmit a beam 225 to provide three-dimensional coverage over the hub 112. The beam 225 may be also be skewed at an angle (from a vertical direction) to detect objects arriving at, descending to, and landing on the hub 112. The beams 220/225 may be controlled either mechanically (by moving the radar system), electronically (e.g., phased arrays), or by software (e.g., digital phased array "DAPA" radars), or any combination thereof.

The transponder system of a ground station 215 may include an ADS-B and/or a Mode S transponder, and/or other transponder system (collectively, interrogator system). The interrogator system may have at least one directional antenna. The directional antenna may target a section of a route 141. For instance, targeting the section of the route 141 may reduce the likelihood of overwhelming the ecosystem (e.g., aircraft 131) with interrogations, as would be the case if the interrogator system used an omnidirectional antenna. The directional antenna may target a specific section of a route 141 by transmitting signals in a same or different beam pattern as the beam 220/225 discussed above for the radar system. The interrogator system may transmit interrogation messages to aircraft, such as aircraft 131, within the section of the route 141. The interrogation messages may include an identifier of the interrogator system and/or request the aircraft, such as aircraft 131, to transmit an identification message. The interrogator system may receive the identification message from the aircraft, such as aircraft 131. The identification message may include an identifier of the aircraft and/or transponder aircraft data (e.g., speed, location, track, etc.) of the aircraft.

If the radar system detects an object and the transponder system does not receive a corresponding identification message from the object (or does receive an identification message, but it is an invalid identification message, e.g., an identifier of un-authorized aircraft), the ground station 215 may determine that the object is an intruder aircraft 230. The ground station 215 may then transmit an intruder alert message to the cloud service 205. If the radar system detects an object and the transponder system receives a corresponding identification message from the object, the ground station 215 may determine the object is a valid aircraft. The ground station 215 may then transmit a valid aircraft message to the cloud service 205. Additionally or alternatively, the ground station 215 may transmit a detection message based on the detection of the object and whether the ground station 215 receives the identification message ("a response message"); therefore, the ground station 215 may not make a determination as to whether the detected object is an intruder aircraft or a valid aircraft, but instead send the detection message to the cloud service 205 for the cloud service 205 to determine whether the detected object is an intruder aircraft or a valid aircraft.

The datalink system of ground station 215 may communicate with at least one of the one or more communications station(s) 210. Each of the one or more communications station(s) 210 may communicate with at least one of the one or more ground station(s) 215 within a region around the communications station 210 to receive and transmit data from/to the one or more ground station(s) 215. Some or none of the communications station(s) 210 may not communicate directly with the ground station(s) 215, but may instead be relays from other communications station(s) 210 that are in direct communication with the ground station(s) 215. For instance, each of the ground station(s) 215 may communicate with a nearest one of the communications station(s) 210 (directly or indirectly). Additionally or alternatively, the ground station(s) 215 may communicate with a communications station 210 that has a best signal to the ground station 215, best bandwidth, etc. The one or more communications station(s) 210 may include a wireless communication system to communicate with the datalink system of ground station(s) 215. The wireless communication system may enable cellular communication, in accordance with, e.g., 3G/4G/5G standards. The wireless communication system may enable Wi-Fi communications, Bluetooth communications, or other short range wireless communications. Additionally or alternatively, the one or more communications station(s) 210 may communicate with the one or more of the one or more ground station(s) 215 based on wired communication, such as Ethernet, fiber optic, etc.

For instance, a ground station 215 may transmit an intruder alert message or a valid aircraft message (and/or a detection message) to a communications station 210. The communications station 210 may then relay the intruder alert message or the valid aircraft message (and/or the detection message) to the cloud service 205 (either directly or indirectly through another communications station 210).

The one or more communications station(s) 210 may also communicate with one or more aircraft, such as aircraft 131, to receive and transmit data from/to the one or more aircraft. For instance, one or more communications station(s) 210 may relay data between the cloud service 205 and a vehicle, such as aircraft 131.

The cloud service 205 may communicate with the one or more communications station(s) 210 and/or directly (e.g., via satellite communications) with aircraft, such as aircraft 131. The cloud service 205 may provide instructions, data, and/or warnings to the aircraft 131. The cloud service 205 may receive acknowledgements from the aircraft 131, aircraft data from the aircraft 131, and/or other information from the aircraft 131. For instance, the cloud service 205 may provide, to the aircraft 131, weather data, traffic data, landing zone data for the hubs, such as hubs 111-117, updated obstacle data, flight plan data, etc. The cloud service 205 may also provide software as a service (SaaS) to aircraft 131 to perform various software functions, such as navigation services, Flight Management System (FMS) services, etc., in accordance with service contracts, API requests from aircraft 131, etc.

Figure 3A:
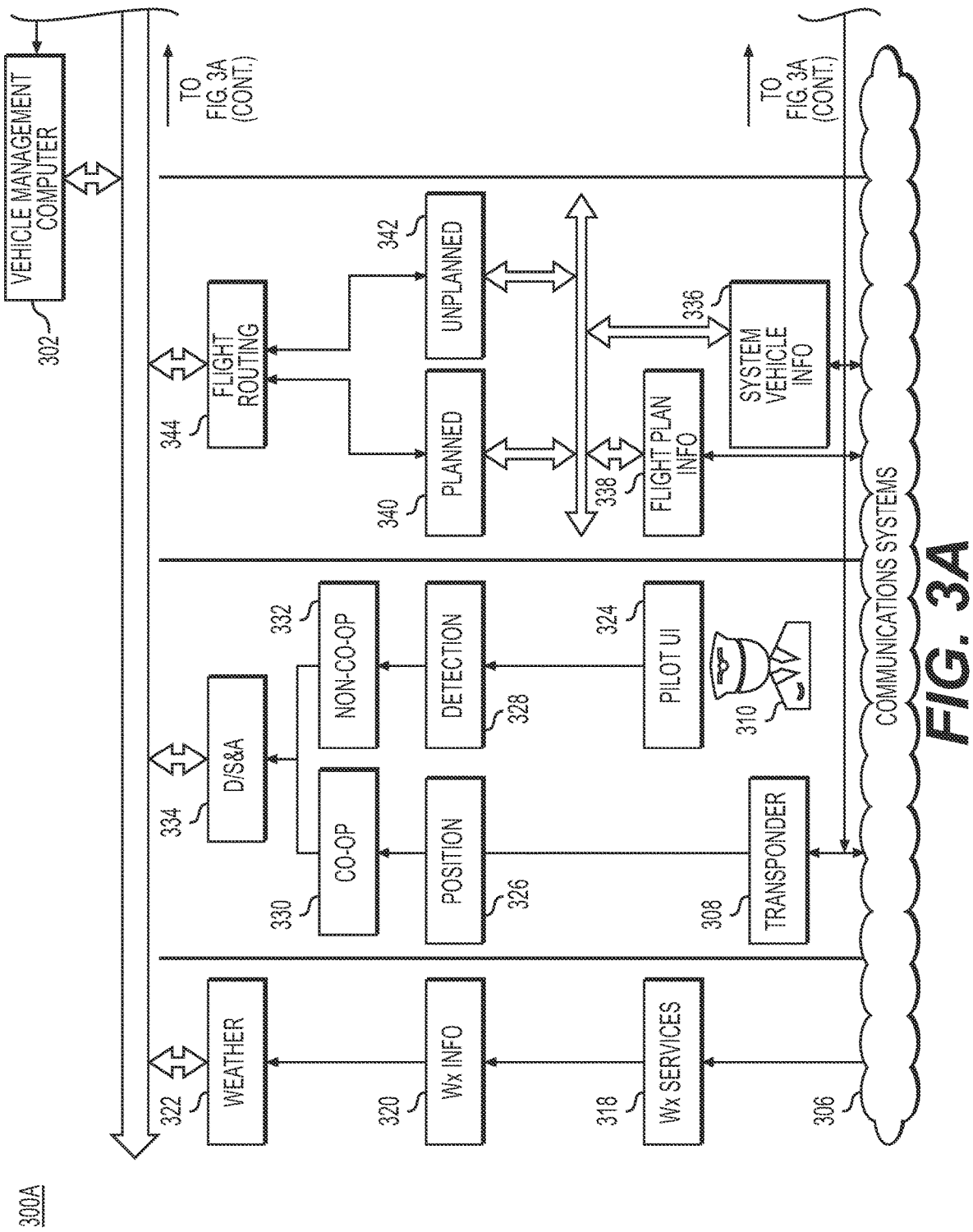
FIGS. 3A and 3B depict exemplary block diagrams of a vehicle of a system, according to one or more embodiments.
Figure 3A:
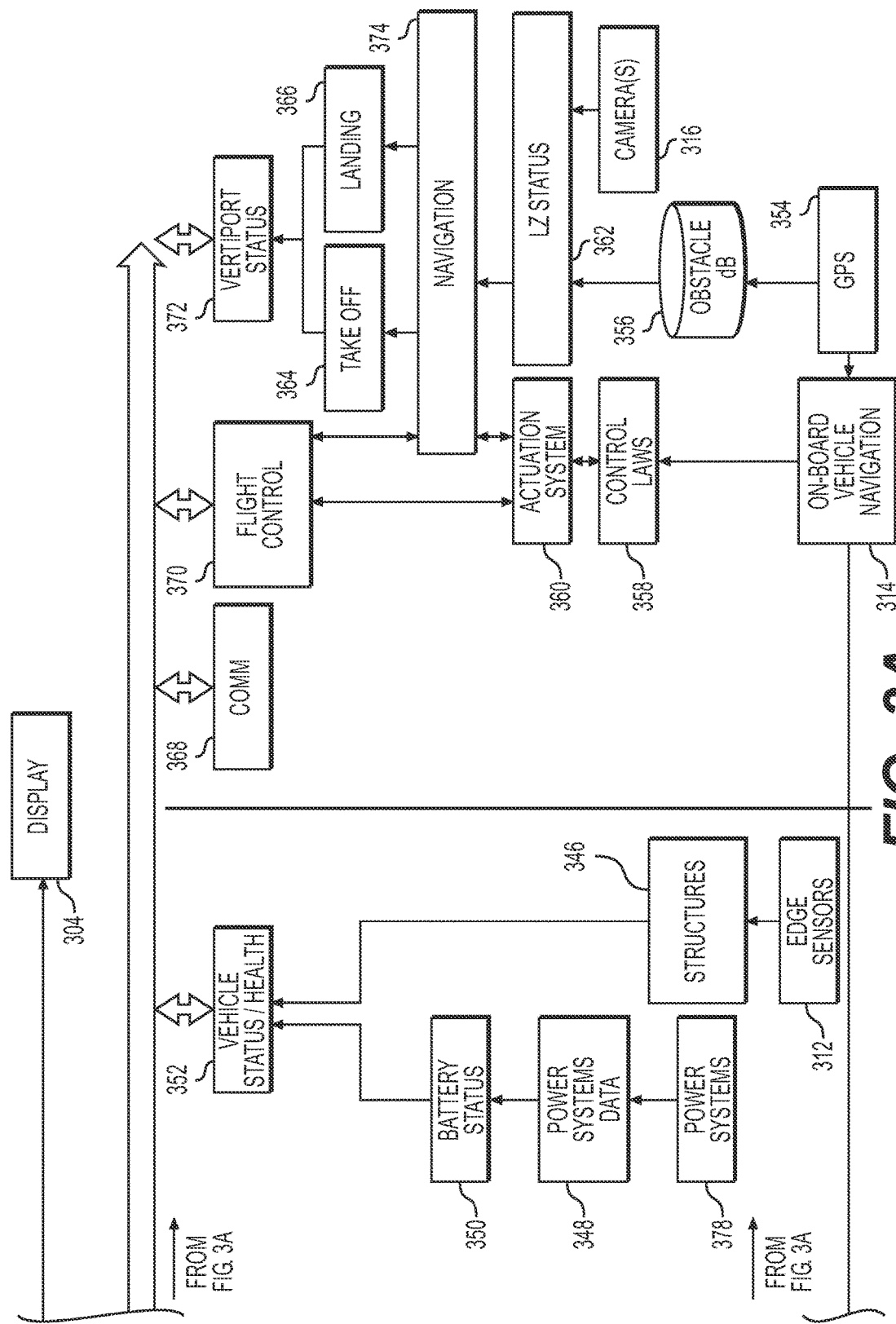
Figure 3B:
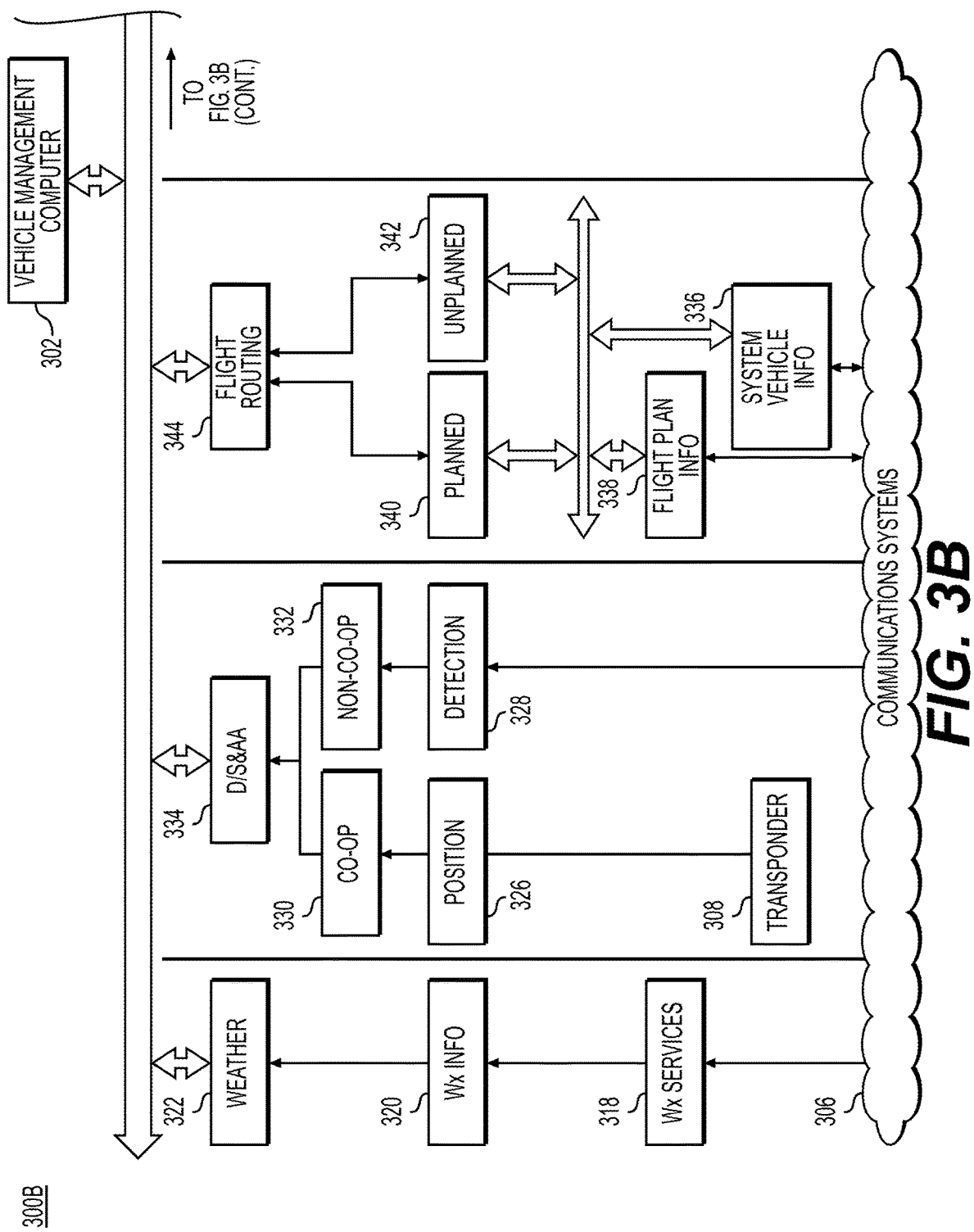
Figure 3B:
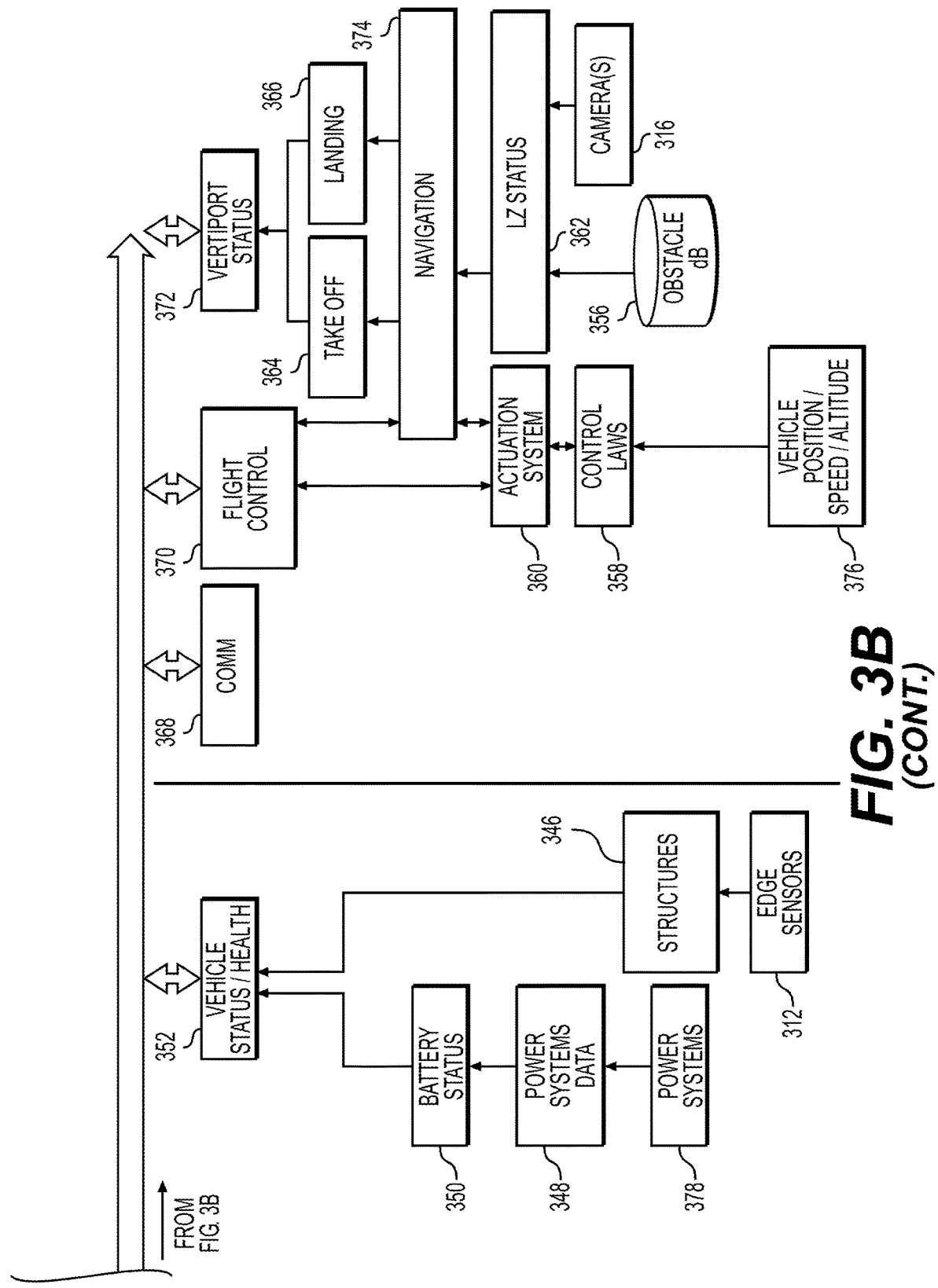

FIGS. 3A and 3B depict exemplary block diagrams of a vehicle of a system, according to one or more embodiments. FIG. 3A may depict a block diagram 300A and FIG. 3B may depict a block diagram 300B, respectively, of a vehicle, such as aircraft 131-133. Generally, the block diagram 300A may depict systems, information/data, and communications between the systems of a piloted or semi-autonomous vehicle, while the block diagram 300B may depict systems, information/data, and communications between the systems of a fully autonomous vehicle. The aircraft 131 may be one of the piloted or semi-autonomous vehicle and/or the fully autonomous vehicle.

The block diagram 300A of an aircraft 131 may include a vehicle management computer 302 and electrical, mechanical, and/or software systems (collectively, "vehicle systems"). The vehicle systems may include: one or more display(s) 304; communications systems 306; one or more transponder(s) 308; pilot/user interface(s) 324 to receive and communicate information from pilots and/or users 310 of the aircraft 131; edge sensors 312 on structures 346 of the aircraft 131 (such as doors, seats, tires, etc.); power systems 378 to provide power to actuation systems 360; camera(s) 316; GPS systems 354; on-board vehicle navigation systems 314; flight control computer 370; and/or one or more data storage systems. The vehicle management computer 302 and the vehicle systems may be connected by one or a combination of wired or wireless communication interfaces, such as TCP/IP communication over Wi-Fi or Ethernet (with or without switches), RS-422, ARINC-429, or other communication standards (with or without protocol switches, as needed).

The vehicle management computer 302 may include at least a network interface, a processor, and a memory, each coupled to each other via a bus or indirectly via wired or wireless connections (e.g., Wi-Fi, Ethernet, parallel or serial ATA, etc.). The memory may store, and the processor may execute, a vehicle management program. The vehicle management program may include a weather program 322, a Detect/Sense and Avoid (D/S & A) program 334, a flight routing program 344, a vehicle status/health program 352, a communications program 368, a flight control program 370, and/or a vertiport status program 372 (collectively, "sub-programs"). The vehicle management program may obtain inputs from the sub-programs and send outputs to the sub-programs to manage the aircraft 131, in accordance with program code of the vehicle management program. The vehicle management program may also obtain inputs from the vehicle systems and output instructions/data to the vehicle systems, in accordance with the program code of the vehicle management program.

The vehicle management computer 302 may transmit instructions/data/graphical user interface(s) to the one or more display(s) 304 and/or the pilot/user interface(s) 324. The one or more display(s) 304 and/or the pilot/user interface(s) 324 may receive user inputs, and transmit the user inputs to the vehicle management computer 302.

The communications systems 306 may include various data links systems (e.g., satellite communications systems), cellular communications systems (e.g., LTE, 4G, 5G, etc.), radio communications systems (e.g., HF, VHF, etc.), and/or wireless local area network communications systems (e.g., Wi-Fi, Bluetooth, etc.). The communications systems 306 may enable communications, in accordance with the communications program 368, between the aircraft 131 and external networks, services, and the cloud service 205, discussed above. An example of the external networks may include a wide area network, such as the internet. Examples of the services may include weather information services 318, traffic information services, etc.

The one or more transponder(s) 308 may include an interrogator system. The interrogator system of the aircraft 131 may be an ADS-B, a Mode S transponder, and/or other transponder system. The interrogator system may have an omnidirectional antenna and/or a directional antenna (interrogator system antenna). The interrogator system antenna may transmit/receive signals to transmit/receive interrogation messages and transmit/receive identification messages. For instance, in response to receiving an interrogation message, the interrogator system may obtain an identifier of the aircraft 131 and/or transponder aircraft data (e.g., speed, location, track, etc.) of the aircraft 131, e.g., from the on-board vehicle navigation systems 314; and transmit an identification message. Contra-wise, the interrogator system may transmit interrogation messages to nearby aircraft; and receive identification messages. The one or more transponder(s) 308 may send messages to the vehicle management computer 302 to report interrogation messages and/or identification messages received from/transmitted to other aircraft and/or the ground station(s) 215. As discussed above, the interrogation messages may include an identifier of the interrogator system (in this case, the aircraft 131), request the nearby aircraft to transmit an identification message, and/or (different than above) transponder aircraft data (e.g., speed, location, track, etc.) of the aircraft 131; the identification message may include an identifier of the aircraft 131 and/or the transponder aircraft data of the aircraft 131.

The edge sensors 312 on the structures 346 of the aircraft 131 may be sensors to detect various environmental and/or system status information. For instance, some of the edge sensors 312 may monitor for discrete signals, such as edge sensors on seats (e.g., occupied or not), doors (e.g., closed or not), etc. of the aircraft 131. Some of the edge sensors 312 may monitor continuous signals, such as edge sensors on tires (e.g., tire pressure), brakes (e.g., engaged or not, amount of wear, etc.), passenger compartment (e.g., compartment air pressure, air composition, temperature, etc.), support structure (e.g., deformation, strain, etc.), etc., of the aircraft 131. The edge sensors 312 may transmit edge sensor data to the vehicle management computer 302 to report the discrete and/or continuous signals.

The power systems 378 may include one or more battery systems, fuel cell systems, and/or other chemical power systems to power the actuation systems 360 and/or the vehicle systems in general. In one aspect of the disclosure, the power systems 378 may be a battery pack. The power systems 378 may have various sensors to detect one or more of temperature, fuel/electrical charge remaining, discharge rate, etc. (collectively, power system data 348). The power systems 378 may transmit power system data 348 to the vehicle management computer 302 so that power system status 350 (or battery pack status) may be monitored by the vehicle status/health program 352.

The actuation systems 360 may include: motors, engines, and/or propellers to generate thrust, lift, and/or directional force for the aircraft 131; flaps or other surface controls to augment the thrust, lift, and/or directional force for the aircraft 131; and/or aircraft mechanical systems (e.g., to deploy landing gear, windshield wiper blades, signal lights, etc.). The vehicle management computer 302 may control the actuation systems 360 by transmitting instructions, in accordance with the flight control program 370, and the actuation systems 360 may transmit feedback/current status of the actuation systems 360 to the vehicle management computer 302 (which may be referred to as actuation systems data).

The camera(s) 316 may include inferred or optical cameras, LIDAR, or other visual imaging systems to record internal or external environments of the aircraft 131. The camera(s) 316 may obtain inferred images; optical images; and/or LIDAR point cloud data, or any combination thereof (collectively "imaging data"). The LIDAR point cloud data may include coordinates (which may include, e.g., location, intensity, time information, etc.) of each data point received by the LIDAR. The camera(s) 316 and/or the vehicle management computer 302 may include a machine vision function. The machine vision function may process the obtained imaging data to detect objects, locations of the detected objects, speed/velocity (relative and/or absolute) of the detected objects, size and/or shape of the detected objects, etc. (collectively, "machine vision outputs"). For instance, the machine vision function may be used to image a landing zone to confirm the landing zone is clear/unobstructed (a landing zone (LZ) status 362). Additionally or alternatively, the machine vision function may determine whether physical environment (e.g., buildings, structures, cranes, etc.)

around the aircraft 131 and/or on/near the routes 141 may be or will be (e.g., based on location, speed, flight plan of the aircraft 131) within a safe flight envelope of the aircraft 131. The imaging data and/or the machine vision outputs may be referred to as "imaging output data." The camera(s) 316 may transmit the imaging data and/or the machine vision outputs of the machine vision function to the vehicle management computer 302. The camera(s) 316 may determine whether elements detected in the physical environment are known or unknown based on obstacle data stored in an obstacle database 356, such as by determining a location of the detected object and determining if an obstacle in the obstacle database has the same location (or within a defined range of distance). The imaging output data may include any obstacles determined to not be in the obstacle data of the obstacle database 356 (unknown obstacles information).

The GPS systems 354 may include one or more global navigation satellite (GNSS) receivers. The GNSS receivers may receive signals from the United States developed Global Position System (GPS), the Russian developed Global Navigation Satellite System (GLONASS), the European Union developed Galileo system, and/or the Chinese developed BeiDou system, or other global or regional satellite navigation systems. The GNSS receivers may determine positioning information for the aircraft 131. The positioning information may include information about one or more of position (e.g., latitude and longitude, or Cartesian coordinates), altitude, speed, heading, or track, etc. for the vehicle. The GPS systems 354 may transmit the positioning information to the on-board vehicle navigation systems 314 and/or to the vehicle management computer 302.

The on-board vehicle navigation systems 314 may include one or more radar(s), one or more magnetometer(s), an attitude heading reference system (AHRS), and/or one or more air data module(s). The one or more radar(s) may be weather radar(s) to scan for weather and/or light weight digital radar(s), such as DAPA radar(s) (either omnidirectional and/or directional), to scan for terrain/ground/objects/obstacles. The one or more radar(s) may obtain radar information. The radar information may include information about the local weather and the terrain/ground/objects/obstacles (e.g., aircraft or obstacles and associated locations/movement). The one or more magnetometer(s) may measure magnetism to obtain bearing information for the aircraft 131. The AHRS may include sensors (e.g., three sensors on three axes) to obtain attitude information for the aircraft 131. The attitude information may include roll, pitch, and yaw of the aircraft 131. The air data module(s) may sense external air pressure to obtain airspeed information for the aircraft 131. The radar information, the bearing information, the attitude information, airspeed information, and/or the positioning information (collectively, navigation information) may be transmitted to the vehicle management computer 302.

The weather program 322 may, using the communications systems 306, transmit and/or receive weather information from one or more of the weather information services 318. For instance, the weather program 322 may obtain local weather information from weather radars and the on-board vehicle navigation systems 314, such as the air data module(s). The weather program may also transmit requests for weather information 320. For instance, the request may be for weather information 320 along a route 141 of the aircraft 131 (route weather information). The route weather information may include information about precipitation, wind, turbulence, storms, cloud coverage, visibility, etc. of the external environment of the aircraft 131 along/near a flight path, at a destination and/or departure location (e.g., one of the hubs 111-117), or for a general area around the flight path, destination location, and/or departure location. The one or more of the weather information services 318 may transmit responses that include the route weather information. Additionally or alternatively, the one or more of the weather information services 318 may transmit update messages to the aircraft 131 that includes the route weather information and/or updates to the route weather information.

The D/S & A program 334 may, using the one or more transponders 308 and/or the pilot/user interface(s) 324, detect and avoid objects that may pose a potential threat to the aircraft 131. As an example, the pilot/user interface(s) 324 may receive user input(s) from the pilots and/or users of the vehicle 310 (or radar/imaging detection) to indicate a detection of an object; the pilot/user interface(s) 324 (or radar/imaging detection) may transmit the user input(s) (or radar or imaging information) to the vehicle management computer 302; the vehicle management computer 302 may invoke the D/S & A program 334 to perform an object detection process 328 to determine whether the detected object is a non-cooperative object 332 (e.g., it is an aircraft that is not participating in transponder communication); optionally, the vehicle management computer 302 may determine a position, speed, track for the non-cooperative object 332 (non-cooperative object information), such as by radar tracking or image tracking; in response to determining the object is a non-cooperative object 332, the vehicle management computer 302 may determine a course of action, such as instruct the flight control program 370 to avoid the non-cooperative object 332. As another example, the one or more transponder(s) 308 may detect an intruder aircraft (such as intruder aircraft 230) based on an identification message from the intruder aircraft; the one or more transponder(s) 308 may transmit a message to the vehicle management computer 302 that includes the identification message from the intruder aircraft; the vehicle management computer 302 may extract an identifier and/or transponder aircraft data from the identification message to obtain the identifier and/or speed, location, track, etc. of the intruder aircraft; the vehicle management computer 302 may invoke the D/S & A program 334 to perform a position detection process 326 to determine whether the detected object is a cooperative object 330 and its location, speed, heading, track, etc.; in response to determining the object is a cooperative object 330, the vehicle management computer 302 may determine a course of action, such as instruct the flight control program 370 to avoid the cooperative object 330. For instance, the course of action may be different or the same for non-cooperative and cooperative objects 330/332, in accordance with rules based on regulations and/or scenarios.

The flight routing program 344 may, using the communications systems 306, generate/receive flight plan information 338 and receive system vehicle information 336 from the cloud service 205. The flight plan information 338 may include a departure location (e.g., one of the hubs 111-117), a destination location (e.g., one of the hubs 111-117), intermediate locations (if any) (e.g., waypoints or one or more of the hubs 111-117) between the departure and destination locations, and/or one or more routes 141 to be used (or not used). The system vehicle information 336 may include other aircraft positioning information for other aircraft with respect to the aircraft 131 (called a "receiving aircraft 131" for reference). For instance, the other aircraft positioning information may include positioning information of the other aircraft. The other aircraft may include: all aircraft 131-133 and/or intruder aircraft 230; aircraft 131-

133 and/or intruder aircraft 230 within a threshold distance of the receiving aircraft 131; aircraft 131-133 and/or intruder aircraft 230 using a same route 141 (or is going to use the same route 141 or crossing over the same route 141) of the receiving aircraft; and/or aircraft 131-133 and/or intruder aircraft 230 within a same geographic area (e.g., city, town, metropolitan area, or sub-division thereof) of the receiving aircraft.

The flight routing program 344 may determine or receive a planned flight path 340. The flight routing program 344 may receive the planned flight path 340 from another aircraft 131 or the cloud service 205 (or other service, such as an operating service of the aircraft 131). The flight routing program 344 may determine the planned flight path 340 using various planning algorithms (e.g., flight planning services on-board or off-board the aircraft 131), aircraft constraints (e.g., cruising speed, maximum speed, maximum/minimum altitude, maximum range, etc.) of the aircraft 131, and/or external constraints (e.g., restricted airspace, noise abatement zones, etc.). The planned/received flight path may include a 4-D trajectory of a flight trajectory with 4-D coordinates, a flight path based on waypoints, any suitable flight path for the aircraft 131, or any combination thereof, in accordance with the flight plan information 338 and/or the system vehicle information 336. The 4-D coordinates may include 3-D coordinates of space (e.g., latitude, longitude, and altitude) for a flight path and time coordinate.

The flight routing program 344 may determine an unplanned flight path 342 based on the planned flight path 340 and unplanned event triggers, and using the various planning algorithms, the aircraft constraints of the aircraft 131, and/or the external constraints. The vehicle management computer 302 may determine the unplanned event triggers based on data/information the vehicle management compute 302 receives from other vehicle systems or from the cloud service 205. The unplanned event triggers may include one or a combination of: (1) emergency landing, as indicated by the vehicle status/health program 352 discussed below or by a user input to one or more display(s) 304 and/or the pilot/user interface(s) 324; (2) intruder aircraft 230, cooperative object 330, or non-cooperative object 332 encroaching on a safe flight envelope of the aircraft 131; (3) weather changes indicated by the route weather information (or updates thereto); (4) the machine vision outputs indicating a portion of the physical environment may be or will be within the safe flight envelope of the aircraft 131; and/or (5) the machine vision outputs indicating a landing zone is obstructed.

Collectively, the unplanned flight path 342/the planned flight path 340 and other aircraft positioning information may be called flight plan data.

The vehicle status/health program 352 may monitor vehicle systems for status/health, and perform actions based on the monitored status/health, such as periodically report status/health, indicate emergency status, etc. The vehicle may obtain the edge sensor data and the power system data 348. The vehicle status/health program 352 may process the edge sensor data and the power system data 348 to determine statuses of the power system 378 and the various structures and systems monitored by the edge sensors 312, and/or track a health of the power system 378 and structures and systems monitored by the edge sensors 312. For instance, the vehicle status/health program 352 may obtain the power systems data 348; determine a battery status 350; and perform actions based thereon, such as reduce consumption of non-essential systems, report battery status, etc. The vehicle status/health program 352 may determine an emergency landing condition based on one or more of the power system 378 and structures and systems monitored by the edge sensors 312 has a state that indicates the power system 378 and structures and systems monitored by the edge sensors 312 has or will fail soon. Moreover, the vehicle status/health program 352 may transmit status/health data to the cloud service 205 as status/health messages (or as a part of other messages to the cloud service). The status/health data may include the actuation systems data, all of the edge sensor data and/or the power system data, portions thereof, summaries of the edge sensor data and the power system data, and/or system status indicators (e.g., operating normal, degraded wear, inoperable, etc.) based on the edge sensor data and the power system data.

The flight control program 370 may control the actuation system 360 in accordance with the unplanned flight path 342/the planned flight path 340, the other aircraft positioning information, control laws 358, navigation rules 374, and/or user inputs (e.g., of a pilot if aircraft 131 is a piloted or semi-autonomous vehicle). The flight control program 370 may receive the planned flight path 340/unplanned flight path 342 and/or the user inputs (collectively, "course"), and determine inputs to the actuation system 360 to change speed, heading, attitude of the aircraft 131 to match the course based on the control laws 358 and navigation rules 374. The control laws 358 may dictate a range of actions possible of the actuation system 360 and map inputs to the range of actions to effectuate the course by, e.g., physics of flight of the aircraft 131. The navigation rules 374 may indicate acceptable actions based on location, waypoint, portion of flight path, context, etc. (collectively, "circumstance"). For instance, the navigation rules 374 may indicate a minimum/maximum altitude, minimum/maximum speed, minimum separation distance, a heading or range of acceptable headings, etc. for a given circumstance.

The vertiport status program 372 may control the aircraft 131 during take-off (by executing a take-off process 364) and during landing (by executing a landing process 366). The take-off process 364 may determine whether the landing zone from which the aircraft 131 is to leave and the flight environment during the ascent is clear (e.g., based on the control laws 358, the navigation rules 374, the imaging data, the obstacle data, the unplanned flight path 342/the planned flight path 340, the other aircraft positioning information, user inputs, etc.), and control the aircraft or guide the pilot through the ascent (e.g., based on the control laws 358, the navigation rules 374, the imaging data, the obstacle data, the flight plan data, user inputs, etc.). The landing process 366 may determine whether the landing zone on which the aircraft 131 is to land and the flight environment during the descent is clear (e.g., based on the control laws 358, the navigation rules 374, the imaging data, the obstacle data, the flight plan data, user inputs, the landing zone status, etc.), and control the aircraft or guide the pilot through the descent (e.g., based on the control laws 358, the navigation rules 374, the imaging data, the obstacle data, the flight plan data, user inputs, the landing zone status, etc.).

The one or more data storage systems may store data/information received, generated, or obtained onboard the aircraft. The one or more data storage systems may also store software for one or more of the computers onboard the aircraft.

The block diagram 300B may be the same as the block diagram 300A, but the block diagram 300B may omit the pilot/user interface(s) 324 and/or the one or more displays 304, and include a vehicle position/speed/altitude system 376. The vehicle position/speed/altitude system 376 may include or not include the on-board vehicle navigation systems 314 and/or the GPS systems 354, discussed above. In the case that the vehicle position/speed/altitude system 376 does not include the on-board vehicle navigation systems 314 and/or the GPS systems 354, the vehicle position/speed/altitude system 376 may obtain the navigation information from the cloud service 205.

In one aspect of the disclosure, one or more (e.g., two, three, a plurality of) aircraft 131 (of either the block diagram 300A and/or the block diagram 300B) may transmit vehicle data to the cloud service 205 (each transmitting aircraft 131 transmitting vehicle data may be referred to as "transmitting aircraft 131"). The vehicle data may include one or a combination of: (1) transponder aircraft data (from the one or more transponder(s) 308) for one or more other aircraft near the aircraft 131); (2) non-cooperative object information for aircraft objects detected by the one or more transponder(s) 308); (3) navigation information (or one of the components thereof: the radar information, the bearing information, the attitude information, the airspeed information, and/or the positioning information); (4) imaging output data (the imaging data, the machine vision outputs, and/or the unknown obstacles information); and/or (5) status/health data (either the edge sensor data and/or the power system data).

The aircraft 131 may transmit the vehicle data (in vehicle data messages) through one or more (or combinations thereof) of various methods. For instance, the aircraft 131 may transmit the vehicle data by: transmission through the communications systems 306 to a receiving station (for the type of communication, such as the communications station(s) 210, a satellite, a 3G/4G/5G base station, etc.) operated by or on behalf of the cloud service 205; transmission through the communications systems 306 to receiving station of a third party that would forward it to the cloud service 205 (e.g., over the internet); transmission through the communications systems 306 to another aircraft 131 (referred to as a data aggregator) that would forward it to the cloud service 205.

The cloud service 205 may receive the vehicle data from the one or more (or the plurality of) of the aircraft 131. Receipt of the vehicle data from the one or more (or the plurality of) of the aircraft 131 may be a trigger event for the cloud service 205 to perform an analysis process. Generally, the aircraft 131 may transmit vehicle data messages continuously during a flight, at predetermined intervals during the flight (time, distance, altitude, or combinations thereof, etc.), and/or in response to on-board triggers (e.g., waypoints, detect object/obstacle, traffic above expectations or limits, etc.). For instance, the aircraft 131 may transmit a vehicle data message every few seconds (such as in accordance with regulations by the certification authorities and/or needed by a fleet service to maintain fleet dispatch and availability rates). As each aircraft 131 may be generating and transmitting large amounts of data (e.g., heading, speed, concurrence to flight plan, vehicle and battery health, altitude, separation from leading vehicle, etc.), and a number of aircraft 131 operating in a given urban environment could be high (e.g., 500+ aircraft per urban environment), the cloud service 205 may perform data aggregation, analysis, and alerting/notifying for one or more fleet services that directly operate and manage the aircraft 131.

In response to receiving the vehicle data from the aircraft 131 (or from a threshold number of aircraft 131, after a threshold period of time after receiving the vehicle data from the aircraft 131, or periodically), the cloud service 205 may perform a vehicle data analysis process. The vehicle data analysis process may include: obtaining collective vehicle data and vehicle parameters; performing an analysis on the vehicle data (received for one or more aircraft 131), the collective vehicle data, and the vehicle parameters to obtain an analysis result to detect a vehicle parameter event, or detect an environment change; determining whether a vehicle parameter event occurs or an environment change occurs based on the analysis result (e.g., the analysis result indicates an environment change or a vehicle parameter event); in response to determining the vehicle parameter event or the environment change occurs, generating and transmitting a status message to a service associated with the vehicle.

The collective vehicle data may include one or a combination of: previously received vehicle data; and obstacle information for obstacles. The previously received vehicle data may include previously received vehicle data from the transmitting aircraft 131, and/or previously received vehicle data from other aircraft 131. The other aircraft 131 may include all other aircraft 131, aircraft 131 on same route 141/within threshold of the flight path of the transmitting aircraft 131, aircraft 131 in a same geographic area, such as city, metropolitan area, or subdivision thereof, as the transmitting aircraft 131. The previously received vehicle data may be the most recently received vehicle data, all vehicle data for a flight of the aircraft 131 that transmitted the vehicle data, or for a set predetermined period before the current time. The obstacle information may include object information (e.g., shape, type, etc.) and position information for all obstacles known to the cloud service 205 or a portion of all obstacles known in/on/near the route 141/flight path of the transmitting aircraft 131 (e.g., obstacles within a threshold distance to a point on the route 141/flight path).

The vehicle parameters may include one or combinations of: power system requirements information, structural requirements information, actuation systems requirements information, certification requirements information, and new obstacle criteria information. The power system requirements information may include minimums, maximums, trends, averages, reserve requirements, etc. to ensure the components of the power systems of the aircraft 131 are serviceable and safe. The structural requirements information may include minimums, maximums, trends, averages, etc. to ensure the components of the structures 346 of the aircraft 131 are serviceable and safe. The actuation systems requirements information may include minimums, maximums, trends, averages, etc. to ensure the components of the actuation system 360 of the aircraft 131 are serviceable and safe. The certification requirements information may include acceptable minimums of spacing between aircraft 131 and/or maximums of traffic (e.g., number of aircraft per route 141 (or area of flight path) or per minute for an area of the route 141 or flight path) for the route 141/flight path of the transmitting aircraft 131. The certification requirements information may also include aircraft deviation thresholds for how far off course an aircraft may deviate from (or within) a route 141/flight path. The new obstacle criteria information may include information for size, shape, relative distance from route 131 or flight path, etc. are considered serviceable and safe.

To obtain the collective vehicle data and the vehicle parameters, the cloud service 205 may access and retrieve from storage/memory (physical or logical) the collective vehicle data and the vehicle parameters, or portions thereof. For instance, the cloud service 205 may only retrieve other aircraft 131 vehicle data that is relevant to the received vehicle data from the transmitting aircraft 131 (e.g., on a same route 141 or within a same area); the cloud service 205 may retrieve historical vehicle data for the transmitting data that is relevant to the received vehicle data (e.g., historical navigation information if the received vehicle data includes navigation information, etc.).

The performing the analysis on the vehicle data (received for one or more aircraft 131), the collective vehicle data, and the vehicle parameters to obtain the analysis result to detect the vehicle parameter event, or detect the environment change may include: obtaining trigger rules and applying the trigger rules to the vehicle data to determine one or more analyses to perform. In response to/after determining the one or more analyses to perform, the cloud service 205 may perform the one or more analyses, in series or parallel.

The cloud service 205 may obtain the trigger rules by initiating an analysis program (that includes the trigger rules) and inputting the vehicle data (or indicators of what the vehicle data includes into the analysis program), to obtain calls to one or more programs corresponding to the one or more analyses. The trigger rules may include a first trigger rule (structure rule), a second trigger rule (battery rule), a third trigger rule (actuation system rule), a fourth trigger rule (flight path confirmation rule), a fifth rule (flight spacing rule), and/or a sixth rule (obstacle rule). Each of the trigger rules may determine whether the received vehicle data includes a specific type of information and, if so, initiate a specific process. For instance, the first trigger rule may be a structure rule that initiates a structure analysis if the vehicle data includes the edge sensor data; the second trigger rule may be a battery rule that initiates a battery analysis if the vehicle data includes the power system data; the third trigger rule may be an actuation system rule that initiates a actuation system analysis if the vehicle data includes actuation systems data; the fourth trigger rule may be a flight path confirmation rule that initiates a flight path confirmation analysis if the vehicle data includes the navigation information; the fifth rule may be a flight spacing rule that initiates a flight spacing analysis if the vehicle data includes the navigation information, the transponder aircraft data, or the non-cooperative object information; the sixth rule may be an obstacle rule that initiates an obstacle analysis if the vehicle data includes the imaging output data.

In general, the analyses processes may extract data from the vehicle data, the collective vehicle data, and the vehicle parameters, and determine whether one or more conditions are satisfied. The conditions may have one or more values and one or more logical operators to determine whether an absolute value, average value, or trend value of a given parameter are within acceptable minimums, maximums, ranges, etc. (as the case may be for the analysis process).

To initiate the structure analysis in response to the structure rule being triggered, the analysis program may invoke a structure program to execute the structure analysis. The structure program may extract edge sensor data from the vehicle data, extract previous edge sensor data from the collective vehicle data, and extract structural requirements information from the vehicle parameters. The structure program may then update tracking information for the components of the structures 346 of the aircraft 131, and determine whether one or more structural conditions are satisfied. For instance, a first structural condition may whether stress to a structural component (as measured by a stress gauge of the edge sensors 312) of the structures 346 is above a threshold level (either as an average, instantaneous reading, trend value, etc.); a second structural condition may be whether a hard landing has occurred, for example by determining whether an edge sensor (such as an accelerometer) measured a descent rate above a threshold descent rate, for instance during a period of descent (e.g., a last meter of flight); a third structural condition may be whether a center of gravity (CG) location has remained within a defined CG three dimensional region of the aircraft 131, for example by determining an attitude and loading of the aircraft to calculate the CG location, and compare the CG location to the CG three dimensional region to determine whether the CG location remained within the CG three dimension region. If one or more of the structural conditions fails (e.g., exceeds a threshold), the structural program may determine a structural vehicle parameter event.

To initiate the battery analysis in response to the battery rule being triggered, the analysis program may invoke a battery program to execute the battery analysis. The battery program may extract power system data from the vehicle data, extract historical power system data from the collective vehicle data, and extract power system requirements information from the vehicle parameters. The battery program may then update tracking information for the components of the power systems 378 of the aircraft 131, and determine whether one or more battery conditions are satisfied. For instance, a first battery condition may determine whether a battery temperature is above a threshold level (either as an average, instantaneous reading, trend value, etc.), for the battery as a whole or on a battery cell basis; a second battery condition may determine whether a battery charge status is below a threshold level (either as an average, instantaneous reading, trend value, etc.), for the battery as a whole or on a battery cell basis; a third battery condition may determine whether a battery discharge rate is above a threshold level (either as an average, instantaneous reading, trend value, etc.), for the battery as a whole or on a battery cell basis. If one or more of the battery conditions fails (e.g., exceeds a threshold), the battery program may determine a battery vehicle parameter event.

To initiate the actuation system analysis in response to the actuation system rule being triggered, the analysis program may invoke an actuation system program to execute the actuation system analysis. The actuation system program may extract actuation systems data from the vehicle data, extract historical actuation systems data from the collective vehicle data, and extract actuation systems requirements information from the vehicle parameters. The actuation system program may then update tracking information for the components of the actuation system 360 of the aircraft 131, and determine whether one or more actuation system conditions are satisfied. For instance, a first actuation system condition may determine whether Motor RPM (or Motor RPM profile) is above a threshold level (either as an average, instantaneous reading, trend value, etc.); a second actuation system condition may determine whether temperature (or temperature profile) is above a threshold level (either as an average, instantaneous reading, trend value, etc.). If one or more of the actuation system conditions fails (e.g., exceeds a threshold), the actuation system program may determine an actuation system vehicle parameter event.

To initiate the flight path confirmation analysis in response to the flight path confirmation rule being triggered, the analysis program may invoke a flight path confirmation program to execute the flight path confirmation analysis. The flight path confirmation program may extract navigation information from the vehicle data for aircraft 131, extract historical navigation information from the collective vehicle data for aircraft 131, and extract certification requirements information from the vehicle parameters. The flight path confirmation program may then update flight tracking information for the aircraft 131 (e.g., one or more of flight time, speed, GPS heading/track profile over the route 141/flight path, GPS altitude across the flight profile (take-off, transition, climb, cruise, descent, landing), and GPS latitude/longitude) of the aircraft 131, and determine whether one or more flight path confirmation conditions are satisfied. For instance, a flight path confirmation condition may determine whether the flight profile has remained within a threshold of the planned flight path 340 (in accordance with a flight time threshold, a speed threshold, a heading threshold, a GPS altitude/latitude/longitude threshold). If one or more of the flight path confirmation conditions fails (e.g., exceeds a threshold), the flight path confirmation program may determine a flight path confirmation vehicle parameter event.

To initiate the flight spacing analysis in response to the flight spacing rule being triggered, the analysis program may invoke a flight spacing program to execute the flight spacing analysis. The flight spacing program may extract navigation information (and the transponder aircraft data and the non-cooperative object information if included) from the vehicle data for aircraft 131, extract historical navigation information from the collective vehicle data for the aircraft 131 and other aircraft 131, and extract certification requirements information from the vehicle parameters. The flight spacing program may then update tracking information for distance between the aircraft 131 and each of the other aircraft 131 (or only those within a threshold distance), and determine whether one or more flight spacing conditions are satisfied. For instance, a first flight spacing condition may determine whether the distance between the aircraft 131 and one of the other aircraft 131 is below a threshold level (either as an average, instantaneous reading, trend value, etc.); a second flight spacing condition may determine whether a number of aircraft 131 (including the transmitting aircraft 131 and other aircraft 131) are above a threshold number of aircraft. If one or more of the flight spacing conditions fails (e.g., exceeds a threshold), the flight spacing program may determine a flight spacing vehicle parameter event.

To initiate the obstacle analysis in response to the obstacle rule being triggered, the analysis program may invoke an obstacle program to execute the obstacle analysis. The obstacle program may extract imaging output data from the vehicle data, and extract obstacle information from the collective vehicle data, and extract new obstacle criteria information from the vehicle parameters. The obstacle program may then analyze the imaging output data to determine obstacle (or confirm the unknown obstacle of the unknown obstacle information from the imaging data and/or the machine vision outputs), and determine whether an obstacle condition is satisfied. The obstacle condition may determine whether the obstacles are included in the obstacle information, such as by cross-referencing location, size, shape for the obstacle to all (or all locally) known obstacles to check location, size, shape. If the obstacle is determined to not match one of the known obstacles, the object program may determine whether the obstacle satisfies the new obstacle criteria information (e.g., is within a threshold distance of route 141, etc.) If the obstacle satisfies the new obstacle criteria information, the obstacle may be confirmed as a new obstacle, and the obstacle program may determine an environment change.

The cloud service 205 may determine whether one or both of: (1) whether the analysis result indicates an environment change and/or (2) whether the analysis result indicates a vehicle parameter event. The cloud service 205 may determine an environment change when/in response to the obstacle program determines an environment change. The cloud service 205 may determine a vehicle parameter event when/in response to one or combinations of: (1) the structural program determines a structural vehicle parameter event; (2) the battery program determines a battery vehicle parameter event; (3) the actuation system program determines an actuation system vehicle parameter event; (4) the flight path confirmation program determines a flight path confirmation vehicle parameter event; and (5) the flight spacing program determines a flight spacing vehicle parameter event.

In the case that it is determined (or in response to) that the analysis result indicates (one or both) an environment change and/or a vehicle parameter event, the cloud service 205 may transmit the status message to the service associated with the vehicle. For instance, the status message may be include an identifier of the transmitting aircraft 131, one or more indicators depending on the analysis result described above, and/or suggestions based on the analysis result.

For instance, the analysis result may indicate one or combinations of (1) the structural program determines a structural vehicle parameter event; (2) the battery program determines a battery vehicle parameter event; (3) the actuation system program determines an actuation system vehicle parameter event; (4) the flight path confirmation program determines a flight path confirmation vehicle parameter event; (5) the flight spacing program determines a flight spacing vehicle parameter event; and (6) the obstacle program determines an environment change. For instance, when a structural vehicle parameter event occurs, the status message may include a structural indicator; when a battery vehicle parameter event occurs, the status message may include a battery indicator; when an actuation system vehicle parameter event occurs, the status message may include an actuation system indicator; when a flight path confirmation vehicle parameter event occurs, the status message may include a flight path confirmation indicator; when a flight spacing vehicle parameter event occurs, the status message may include a flight spacing indicator; when an environment change occurs, the status message may include an environment change indicator.

The suggestions may correspond to the one or more indicators (and/or correspond to the determination of the environment change and/or the vehicle parameter events). For instance, the suggestions may include (1) when the status message includes a structural indicator, a structural suggestion that may indicate the aircraft 131 may need maintenance and/or to be grounded immediately; (2) when the status message includes a battery indicator, a battery suggestion that may indicate the battery may need maintenance, cannot complete the next planned flight so the aircraft should be grounded, etc.; (3) when the status message includes an actuation system indicator, an actuation system suggestion that may indicate the actuation system 360 may need maintenance or the aircraft should be grounded immediately; (4) when the status message includes a flight path confirmation indicator, a flight path confirmation suggestion that may indicate that aircraft 131 is deviating significantly from the planned flight path 340 (e.g., due to weather, traffic, new obstacles, etc.); (5) when the status message includes a flight spacing indicator, a flight spacing suggestion that may indicate that the distance between the aircraft 131 should be increased or that the number of aircraft should be decreased for a given area/route 141; and (6) when the status message includes an environment change indicator, an environment change suggestion that may indicate that the obstacle information of the collective vehicle data is to be updated and the obstacle data of the obstacle database 356 on the one or more aircraft 131 is to be updated.

In the case that it is determined that the analysis result does not indicate an environment change and that the analysis result does not indicate a vehicle parameter event (or in response to), the cloud service 205 may await receipt of more vehicle data from the aircraft 131 or the other aircraft 131.

In one aspect of the disclosure, a sample use case may be: (1) an aircraft 131 may perform seven of ten normally scheduled passenger carrying flights over a specified daily duration over a route 141; (2) aircraft 131 may transmit vehicle data to the cloud service 205 periodically or at the end of the seventh flight of the route 141 (including the power system data); (3) the cloud service may analyze the power system data using the battery program to determine that a specific battery cell is running at above normal temperature and current load; (4) the cloud service 205 may note the above normal temperature and current load as a trend (e.g., the temperature and current load have remained above normal for a period of time, e.g., determined by a moving average or any statistical analysis for trends) in the tracking information for the components of the power systems 378; (5) the cloud service may transmit a status message when the trend of the above normal temperature and current load indicates a probability that the remaining day's schedule is reduced to below safe standards, such as on the next flight or a next flight lasting more than a predetermined number of minutes; and (6) the status message may include a battery indicator and a battery suggestion to ground the aircraft 131 with or without a suggestion for a replacement vehicle (either a specific aircraft 131 or aircraft type) for the remaining flights along the route 141 (possibly without passenger revenue flights being disrupted).

In another aspect of the disclosure, a sample use case may be: (1) the aircraft 131 may detect an obstacle (either using a radar of the on-board vehicle navigation systems 314 or the camera(s) 316), such as a construction crane mounted on a building close to the route 141 being used by the aircraft 131; (2) the aircraft 131 may (using the radar or the camera(s) 316) determine a size/shape/location of the obstacles (e.g., geolocates the obstacle position via a GPS correlation and estimates the size and shape by machine vision or radar analysis); (3) compare the detected obstacle with the obstacles included in the obstacle data of the obstacle database 356; (4) if the obstacle is correlated to an obstacle in the obstacle data of the obstacle database 356, the aircraft 131 may note the obstacle as still present and report to the cloud service 205 that the obstacle is still present; (5) if the obstacle is not correlated to an object in the obstacle data of the obstacle database 356, the aircraft may note the obstacle as a potential new obstacle (with location/shape/size information) and transmit the vehicle data to the cloud service (including the imaging output data); (6) the cloud service may proceed to execute the obstacle program to determine whether the obstacle is a new obstacle; (7) in response to determining the obstacle is a new obstacle, the cloud service 205 may transmit a status message to the service indicating that the obstacle data on the aircraft 131 (and any other aircraft 131 to use the route 141 or other aircraft in a same area) should have their obstacle data of the obstacle database 356 updated; and (8) either the cloud service 205 or the service may transmit a broadcast message to the aircraft 131 and/or other aircraft 131 (or may transmit specific update messages to each aircraft 131, or indicate a downloadable update for the aircraft 131) to update the obstacle data of the obstacle database 356 for each of the aircraft 131.

Therefore, as is clear from the above description, the trigger rules, conditions, parameter events, and environment changes may be varied in numerous manners. Furthermore, the vehicle data, the collective vehicle data, and the vehicle parameters may be analyzed using advanced analytics, such as machine learning, to transform the raw date (or the vehicle data and the collective vehicle data) into usable system knowledge. For instance, instead of specific trigger rules and conditions, the vehicle data and collective vehicle data may be formatted into feature vectors; the feature vectors may be input to a machine learning program; and the machine learning program may output one or more targets. The targets may indicate the vehicle parameter events and/or environment changes. The machine learning program may be a reinforcement learning model, an analytical model, a neural network, etc., and the machine learning model may be one or multiple specific machine learning models (e.g., a battery machine learning model, a structural machine learning model, etc., for each of the programs described above).

This enhanced knowledge can then be passed onto the service in charge of the aircraft 131 as an information service/subscription. The advantage for the service in charge of the aircraft 131 is to have this large scale raw data preprocessed by the cloud service 205 into useable information, thus providing better overall performance of the cloud for the service in charge of the aircraft 131 without being inundated with large amounts of vehicle data (or storing the collective vehicle data). Furthermore, certification compliance may well depend on tracking these types of requirements/criteria, and the service in charge of the aircraft 131 may gain an additional benefit in dispatch, availability, and repair management.

As another aspect of the disclosure, the cloud service 205 may periodically (or in response to a trigger or a request from the service) provide reports to the service. For instance, the cloud service 205 may transmit report messages to the service. The report messages may include battery trend information (charge, discharge rate, health, etc.) of the aircraft 131, health-of-vehicle information (structural or actuation systems of the aircraft, location history, and/or flight plan tracking of the aircraft 131, etc.

As another aspect of the disclosure, the cloud service 205 may go versus no-go decisions to operators for individual aircraft 131. For instance, as an aircraft 131 is being prepared or considered for a flight, the service may request a go versus no-go confirmation from the cloud service 205. The request may include an identifier of the vehicle and information about the proposed flight. The cloud service 205 may retrieve historical information from the collective vehicle data for the aircraft 131 based on the identifier, and determine whether the aircraft is appropriate for the proposed flight. For instance, the cloud service 205 may determine whether a battery capacity of the aircraft 131 is sufficient for the proposed flight; whether the aircraft 131 is rated for maneuvers or operations included in the proposed flight, or would exceed allowable environment thresholds (e.g., the aircraft 131 is too load for a section of the proposed flight); whether a structural component of the aircraft 131 is due for maintenance and the proposed flight may interfere with that maintenance or worsen the structural health of the structural component. Based on the above determinations, and variations thereof, the cloud service 205 may transmit a go or no-go message to the service for the aircraft 131 for the proposed flight.

Figure 4:
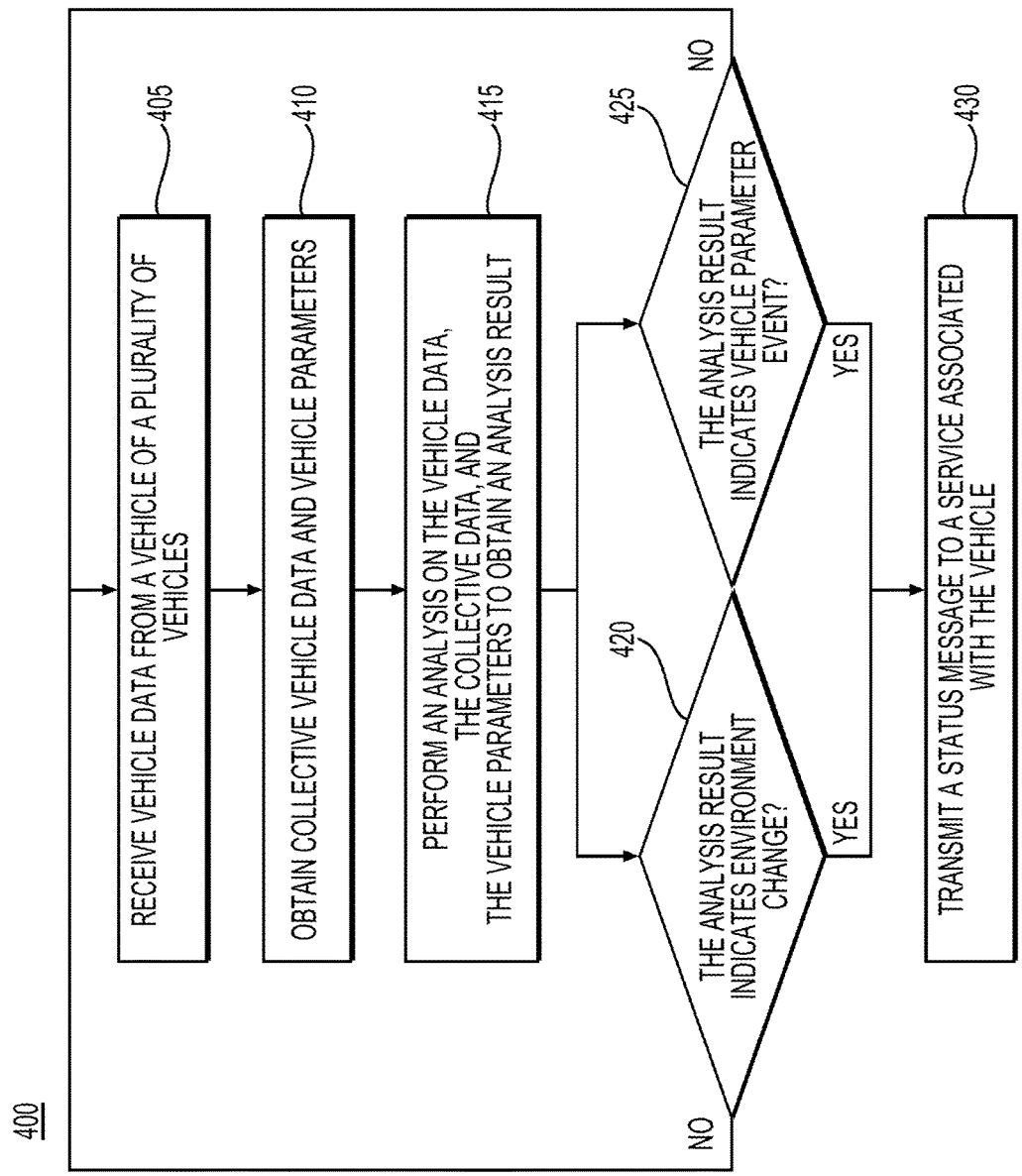
FIG. 4 depicts a flowchart for managing data from vehicles, according to one or more embodiments.

FIG. 4 depicts a flowchart 400 for managing data from vehicles, according to one or more embodiments. The flowchart 400 may depict a process to perform an analysis of the vehicle data to determine environment changes and/or vehicle parameter events. The flowchart 400 may be performed by the cloud service 205.

The cloud service 205 may start the process of flowchart 400 to receive vehicle data from a vehicle of a plurality of vehicles (block 405). For instance, the cloud service 205 may receive vehicle data every set number of seconds from one or more of the aircraft 131 during the respective flights of the aircraft, as discussed above.

The cloud service 205 may continue the process to obtain collective vehicle data and vehicle parameters (bock 410). For instance, the cloud service 205 may retrieve the collective vehicle data and the vehicle parameters that are relevant to the received vehicle data of the transmitting aircraft 131, as discussed above.

The cloud service 205 may continue the process to perform an analysis of the vehicle data, the collective vehicle data, and/or the vehicle parameters to obtain an analysis result (bock 415). For instance, the analysis may obtain and apply the trigger rules and invoke none, one, or a combination of the structure program, the battery program, the actuation system program, the flight path confirmation program, the flight spacing program, and/or the obstacle program, as discussed above.

The cloud service 205 may continue the process to determine one or both of: (1) whether the analysis result indicates an environment change and/or (2) whether the analysis result indicates a vehicle parameter event (blocks 420 and 425, respectively). For instance, the cloud service 205 may determine one or more of the vehicle parameters events or the environment change, as discussed above.

In the case that it is determined that the analysis result indicates an environment change and/or that the analysis result indicates a vehicle parameter event (either or both blocks 420 and 425, respectively: Yes), the cloud service 205 may continue the process to transmit a status message to a service associated with the vehicle (block 430). For instance, the status message may include the identifier, the one or more indicators, and the suggestions, as discussed above. Although not depicted, the cloud service may continue the process to await receipt of vehicle data from the vehicle or another vehicle (Block 405).

In the case that it is determined that the analysis result does not indicate an environment change and that the analysis result does not indicate a vehicle parameter event (blocks 420 and 425, respectively: No), the cloud service 205 may continue the process to await receipt of vehicle data from the vehicle or another vehicle (Block 405).

Figure 5:
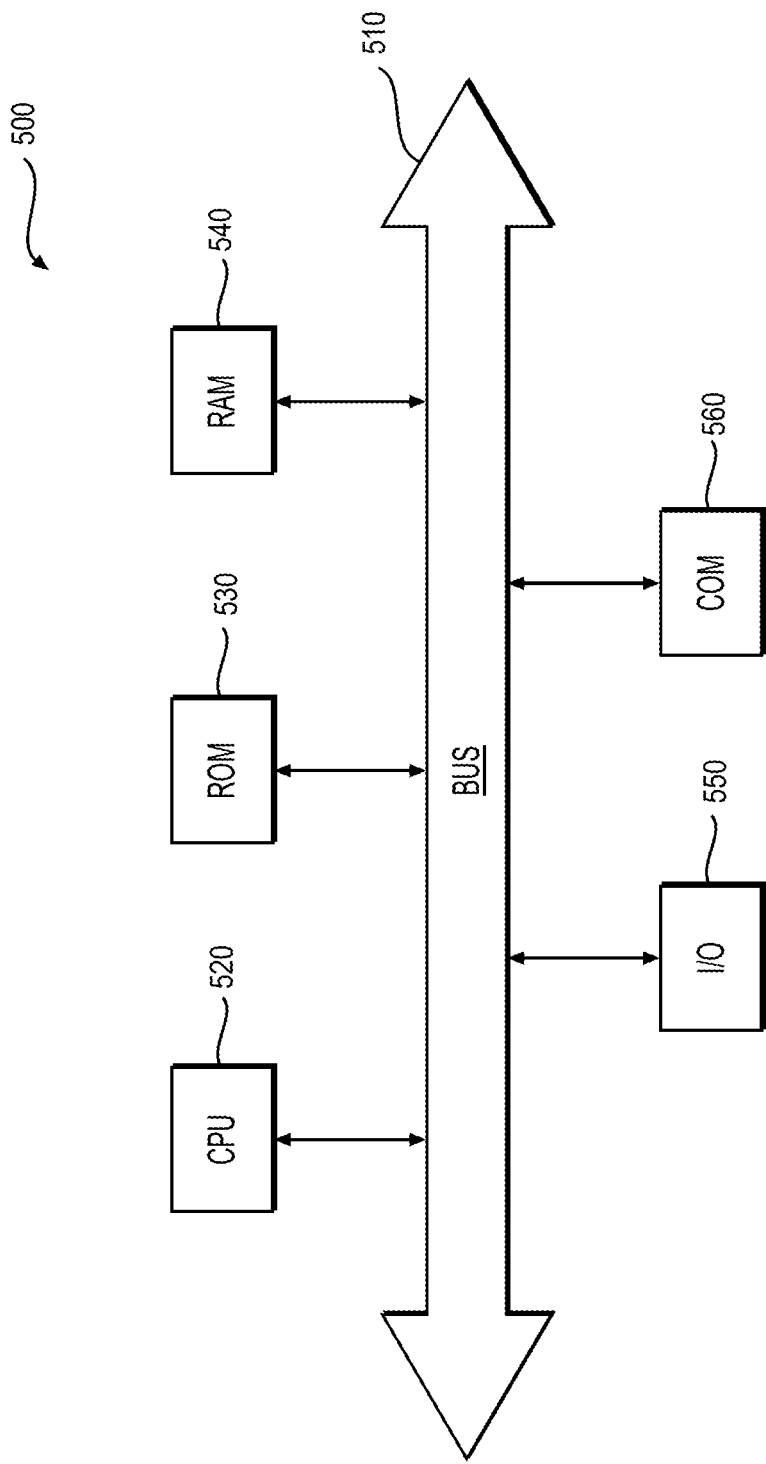
FIG. 5 depicts an example system that may execute techniques presented herein.

FIG. 5 depicts an example system 500 that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The terminology used above may be interpreted in its broadest reasonable manner, even though it is being used in conjunction with a detailed description of certain specific examples of the present disclosure. Indeed, certain terms may even be emphasized above; however, any terminology intended to be interpreted in any restricted manner will be overtly and specifically defined as such in this Detailed Description section. Both the foregoing general description and the detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," "generally," and "approximately" are used to indicate a possible variation of ±10% in a stated value.

The term "exemplary" is used in the sense of "example" rather than "ideal." As used herein, the singular forms "a," "an," and "the" include plural reference unless the context dictates otherwise.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing data received from vehicles, the method comprising:
    performing, by a cloud service external to the vehicles, operations including
        receiving, via a wireless transmission, first vehicle data from a first vehicle;
        identifying a first trigger rule from a plurality of trigger rules based on the first vehicle data, wherein the plurality of trigger rules comprise a structure rule, a battery rule, an actuation system rule, a flight path confirmation rule, a flight spacing rule, and an obstacle rule;
        initiating a first analysis corresponding to the first trigger rule, wherein the first analysis is a first one of a plurality of analyses and each of the plurality of trigger rules corresponds to one of the plurality of analyses;
        obtaining collective vehicle data and vehicle parameters associated with the first analysis from a memory wherein the collective vehicle data was received from a plurality of vehicles having flight paths similar to a first flight path of the first vehicle;
        performing the first analysis on the first vehicle data, the collective vehicle data, and the vehicle parameters to:
            detect a vehicle parameter event when the first trigger rule is one of the structure rule, the battery rule, the actuation system rule, the flight path confirmation rule, and the flight spacing rule, and
            detect an environment change when the first trigger rule is the obstacle rule;
        in response to detecting at least one of the vehicle parameter event and the environment change:
            transmitting, via the wireless transmission, a status message associated with the at least one of the vehicle parameter event and the environmental change to a communication interface of a service associated with the first vehicle to enable the service associated with the first vehicle to implement vehicle dispatch, vehicle availability, and vehicle repair management in connection with the first vehicle, and
            responsive to a request from the service associated with the first vehicle, transmitting a go versus no go decision regarding the use of the first vehicle for a proposed flight;
        receiving an intruder alert from a ground station, the intruder alert comprising an aircraft position of an intruder aircraft detected in the first flight path by the ground station:
        transmitting system vehicle information to the first vehicle, the system vehicle information comprising the aircraft position of the intruder aircraft; and
        responsive to receipt of the system vehicle information, performing by the first vehicle, operations including:
            determining an unplanned flight path based on the system vehicle information; and
            controlling an actuation system of the first vehicle in accordance with the unplanned flight path.

2. The method of claim 1, wherein the flight spacing rule initiates a flight spacing analysis when the first vehicle data includes non-cooperative object information, and
    the obstacle rule initiates an obstacle analysis when the first vehicle data includes imaging output data.

3. The method of claim 1, wherein the collective vehicle data includes previously received vehicle data from the first vehicle, previously received vehicle data from the plurality of vehicles and obstacle information for obstacles known in at least one of close proximity to and on the first flight path of the first vehicle.

4. The method of claim 1, wherein the vehicle parameters include at least one of power system requirements information, structural requirements information, actuation systems requirements information, certification requirements information, and new obstacle criteria information.

5. The method of claim 1, wherein performing the first analysis further comprises:
extracting data from the first vehicle data, the collective vehicle data, and the vehicle parameters, and
determining whether one or more conditions are satisfied.

6. The method of claim 5, wherein, in response to at least one condition failing, performing the first analysis further comprises:
determining whether the vehicle parameter event occurs or the environment change occurs,
generating the status message to include an identifier of the first vehicle, one or more indicators, and one or more suggestions, wherein:
the one or more indicators corresponds to the at least one condition that failed, and
the one or more suggestions indicate at least one of: the first vehicle requires maintenance, the first vehicle should be removed from operations, a replacement vehicle for the first vehicle, a reduction in a number of vehicles, an increase in vehicle spacing, and an obstacle is to be added to an obstacle database of the plurality of vehicles.

7. A system for managing data received from vehicles remote from the system, the system comprising:
a memory of a cloud server storing instructions;
a processor of the cloud server external to the vehicles executing the instructions to perform a process including:
receiving, via a wireless transmission, first vehicle data from a first vehicle;
identifying a first trigger rule from a plurality of trigger rules based on the first vehicle data, wherein the plurality of trigger rules comprise a structure rule, a battery rule, an actuation system rule, a flight path confirmation rule, a flight spacing rule, and an obstacle rule;
initiating a first analysis corresponding to the first trigger rule, wherein the first analysis is a first one of a plurality of analyses and each of the plurality of trigger rules corresponds to one of the plurality of analyses;
obtaining collective vehicle data and vehicle parameters associated with the first analysis from the memory wherein the collective vehicle data was received from a plurality of vehicles having flight paths similar to a first flight path of the first vehicle;
performing the first analysis on the first vehicle data, the collective vehicle data, and the vehicle parameters to:
detect a vehicle parameter event when the first trigger rule is one of the structure rule, the battery rule, the actuation system rule, the flight path confirmation rule, and the flight spacing rule, and
detect an environment change when the first trigger rule is the obstacle rule
in response to detecting at least one of the vehicle parameter event and the environment change:
transmitting, via the wireless transmission, a status message associated with the at least one of the vehicle parameter event and the environmental change to a communication interface of a service associated with the first vehicle to enable the service associated with the first vehicle to implement vehicle dispatch, vehicle availability and vehicle repair management in connection with the first vehicle, and
responsive to a request from the service associated with the first vehicle, transmitting a go versus no go decision regarding the use of the first vehicle for a proposed flight to the service associated with the first vehicle;
receiving an intruder alert from a ground station, the intruder alert comprising an aircraft position of an intruder aircraft detected in the first flight path by the ground station; and
transmitting system vehicle information to the first vehicle, the system vehicle information comprising the aircraft position of the intruder aircraft;
a memory of the first vehicle storing instructions; and
a processor of the first vehicle executing the instructions to perform a process including:
responsive to receipt of the system vehicle information:
determining an unplanned flight path based on the system vehicle information, and
controlling an actuation system of the first vehicle in accordance with the unplanned flight path.

8. The system of claim 7, wherein:
the flight spacing rule initiates a flight spacing analysis when the first vehicle data includes non-cooperative object information, and
the obstacle rule initiates an obstacle analysis when the first vehicle data includes imaging output data.

9. The system of claim 7, wherein the collective vehicle data includes previously received vehicle data from the first vehicle, previously received vehicle data from the plurality of vehicles and obstacle information for obstacles known in at least one of the close proximity to and on a route of the first flight path of the first vehicle.

10. The system of claim 7, wherein the vehicle parameters include at least one of power system requirements information, structural requirements information, actuation systems requirements information, certification requirements information, and new obstacle criteria information.

11. The system of claim 7, wherein performing the first analysis further comprises:
extracting data from the first vehicle data, the collective vehicle data, and the vehicle parameters, and
determining whether one or more conditions are satisfied.

12. The system of claim 11, wherein, in response to at least one condition failing, performing the first analysis further comprises:
determining whether the vehicle parameter event occurs or the environment change occurs,
generating the status message to include an identifier of the first vehicle, one or more indicators, and one or more suggestions, wherein:
the one or more indicators corresponds to the at least one condition that failed, and
the one or more suggestions indicate at least one of: the first vehicle requires maintenance, the first vehicle should be removed from operations, a replacement vehicle for the first vehicle, a reduction in a number of vehicles, an increase in vehicle spacing, and an obstacle is to be added to an obstacle database of the plurality of vehicles.

13. At least two non-transitory computer-readable medium storing instructions that, when executed by at least two processors, cause the at least two processors to perform a method for managing data received from vehicles, the method comprising:

performing, by a cloud service external to the vehicles, operations including:
  receiving, via a wireless transmission, first vehicle data from a first vehicle;
  identifying a first trigger rule from a plurality of trigger rules based on the first vehicle data, wherein the plurality of trigger rules comprise a structure rule, a battery rule, an actuation system rule, a flight path confirmation rule, a flight spacing rule, and an obstacle rule;
  initiating a first analysis corresponding to the first trigger rule, wherein the first analysis is a first one of a plurality of analyses and each of the plurality of trigger rules corresponds to one of the plurality of analyses;
  obtaining collective vehicle data and vehicle parameters associated with the first analysis from a memory wherein the collective vehicle data was received from a plurality of vehicles having flight paths similar to a first flight path of the first vehicle;
  performing the first analysis on the first vehicle data, the collective vehicle data, and the vehicle parameters to:
    detect a vehicle parameter event when the first trigger rule is one of the structure rule, the battery rule, the actuation system rule, the flight path confirmation rule, and the flight spacing rule, and
    detect an environment change when the first trigger rule is the obstacle rule;
  in response to detecting at least one of the vehicle parameter event and the environment change:
    transmitting, via the wireless transmission, a status message associated with the at least one of the vehicle parameter event and the environment change to a communication interface of a service associated with the first vehicle to enable the service associated with the first vehicle to implement vehicle dispatch, vehicle availability, and vehicle repair management in connection with the first vehicle, and
    responsive to a request from the service associated with the first vehicle, transmitting a go versus no go decision regarding the use of the first vehicle for a proposed flight to the service associated with the first vehicle;
  receiving an intruder alert from a ground station, the intruder alert comprising an aircraft position of an intruder aircraft detected in the first flight path by the ground station; and
  transmitting system vehicle information to the first vehicle, the system vehicle information comprising the aircraft position of the intruder aircraft; and
  responsive to receipt of the system vehicle information, performing by the first vehicle, operations including:
    determining an unplanned flight path based on the system vehicle information; and
    controlling an actuation system of the first vehicle in accordance with the unplanned flight path.

14. The at least two non-transitory computer-readable medium of claim 13, wherein:
  the flight spacing rule initiates a flight spacing analysis when the first vehicle data includes non-cooperative object information, and
  the obstacle rule initiates an obstacle analysis when the first vehicle data includes imaging output data.

15. The at least two non-transitory computer-readable medium of claim 13, wherein the collective vehicle data includes previously received vehicle data from the first vehicle, previously received vehicle data from the plurality of vehicles and obstacle information for obstacles known in at least one of close proximity to and on the first flight path of the first vehicle.

16. The at least two non-transitory computer-readable medium of claim 13, wherein the vehicle parameters include at least one of power system requirements information, structural requirements information, actuation systems requirements information, certification requirements information, and new obstacle criteria information.

17. The at least two non-transitory computer-readable medium of claim 13, wherein performing the first analysis further comprises:
  extracting data from the first vehicle data, the collective vehicle data, and the vehicle parameters;
  determining whether one or more conditions are satisfied; and
  in response to at least one condition failing, determining whether the vehicle parameter event occurred or the environment change occurred,
  generating the status message to include an identifier of the first vehicle, one or more indicators, and one or more suggestions, wherein:
    the one or more indicators corresponds to the at least one condition that failed, and
    the one or more suggestions indicate at least one of: the first vehicle requires maintenance, the first vehicle should be removed from operations, a replacement vehicle for the first vehicle, a reduction in a number of vehicles, an increase in vehicle spacing, and an obstacle is to be added to an obstacle database of the plurality of vehicles.

* * * * *